US012693816B2

(12) United States Patent
Yamasaki et al.

(10) Patent No.: US 12,693,816 B2
(45) Date of Patent: Jul. 28, 2026

(54) THROTTLING NOTIFICATIONS TO CLOUD PRINTING SERVICE

(71) Applicants: Tadao Yamasaki, Boulder, CO (US); Gerald Donald Boldt, Longmont, CO (US); Mihai Ciocarlie, Timisoara (RO)

(72) Inventors: Tadao Yamasaki, Boulder, CO (US); Gerald Donald Boldt, Longmont, CO (US); Mihai Ciocarlie, Timisoara (RO)

(73) Assignee: Ricoh Company, Ltd., Tokyo (JP)

( * ) Notice: Subject to any disclaimer, the term of this patent is extended or adjusted under 35 U.S.C. 154(b) by 233 days.

(21) Appl. No.: 18/429,135

(22) Filed: Jan. 31, 2024

(65) Prior Publication Data

US 2025/0244922 A1 Jul. 31, 2025

(51) Int. Cl.
G06F 3/12 (2006.01)

(52) U.S. Cl.
CPC ............. G06F 3/122 (2013.01); G06F 3/1207 (2013.01); G06F 3/1259 (2013.01); G06F 3/1287 (2013.01)

(58) Field of Classification Search
CPC ....... G06F 3/122; G06F 3/1207; G06F 3/1287
See application file for complete search history.

(56) References Cited

U.S. PATENT DOCUMENTS 6,252,614 B1 * 6/2001 Mullin .................... H04L 47/21
                                              358/1.17
8,705,093 B2 4/2014 Gha 9,720,636 B2 * 8/2017 Kim ........................ H04L 67/60
11,644,780 B2 5/2023 Matsumura et al.
2007/0019226 A1 1/2007 Matsuura et al.
2015/0317104 A1 * 11/2015 Takenouchi .......... G06F 3/1238
                                                        358/1.15
2024/0012587 A1 1/2024 Sako et al.

FOREIGN PATENT DOCUMENTS

DE    102010016858 A1    11/2011
JP    2007079997 A       3/2007
JP    2015212893 A       11/2015
JP    2016018324 A       2/2016
JP    2019028755 A       2/2019
JP    2019185088 A       10/2019
JP    2024008595 A       1/2024

OTHER PUBLICATIONS

European Search Report; Application EP25154340; 10 pages; Jun. 4, 2025.
Japanese Office action; Application 2025-013743; 6 pages; Nov. 25, 2025.

* cited by examiner

*Primary Examiner* — Ibrahim Siddo
(74) *Attorney, Agent, or Firm* — Duft & Bornsen, PC

(57) ABSTRACT

System, method, and software of a cloud printing service. In an embodiment, a cloud print mediator is communicatively coupled to a cloud printing service and to a printer. The cloud print mediator is configured to receive a print job from the cloud printing service, submit the print job to the printer, receive status messages from the printer regarding processing of the print job, identify throttling criteria that defines one or more conditions where status notifications are allowed to be reported to the cloud printing service, and perform status notification throttling based on the throttling criteria to regulate the status notifications reported to the cloud printing service in response to the status messages received from the printer.

20 Claims, 14 Drawing Sheets

Figure 8A:
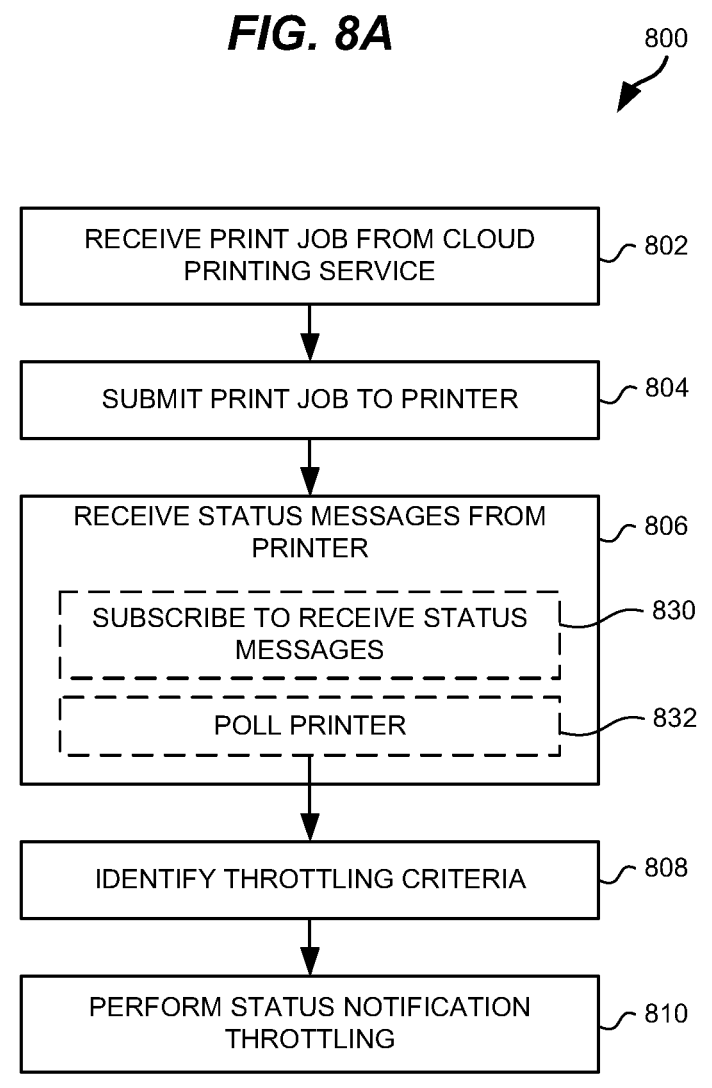

```
RECEIVE PRINT JOB FROM CLOUD
PRINTING SERVICE                          802

↓

SUBMIT PRINT JOB TO PRINTER               804

↓

RECEIVE STATUS MESSAGES FROM              806
PRINTER
┌ ─ ─ ─ ─ ─ ─ ─ ─ ─ ─ ─ ─ ─ ─ ─ ─ ┐
  SUBSCRIBE TO RECEIVE STATUS             830
  MESSAGES
└ ─ ─ ─ ─ ─ ─ ─ ─ ─ ─ ─ ─ ─ ─ ─ ─ ┘
┌ ─ ─ ─ ─ ─ ─ ─ ─ ─ ─ ─ ─ ─ ─ ─ ─ ┐
  POLL PRINTER                           832
└ ─ ─ ─ ─ ─ ─ ─ ─ ─ ─ ─ ─ ─ ─ ─ ─ ┘

↓

IDENTIFY THROTTLING CRITERIA              808

↓

PERFORM STATUS NOTIFICATION               810
THROTTLING
```

THROTTLING NOTIFICATIONS TO CLOUD PRINTING SERVICE

TECHNICAL FIELD

The following disclosure relates to the field of printing, and more particularly, to printing services.

BACKGROUND

Cloud printing services connect devices, such as smartphones, laptops, tablets, personal computers (PCs), etc., with one or more network-connected printers. A user may access the cloud printing service to submit a print job to a network-connected printer. For example, a user may access a commercial cloud printing service to submit a print job to print advertising or marketing materials, product manuals, books, invoices/bills, blueprints, mailings, etc. Although cloud printing services provide multiple benefits, there is an associated cost of operating a cloud printing service on a cloud-computing platform, such as compute resources, storage resources, network resources, message processing, etc.

SUMMARY

Embodiments described herein provide status notification throttling for a cloud printing service. As an overview, when a print job is submitted to a printer by a cloud printing service, the printer can generate a voluminous amount of status updates. In an embodiment, a cloud print mediator is on-ground or on-premises with one or more printers, and is configured to regulate or limit the status updates that are reported to the cloud printing service. One technical benefit is the overall number of status updates reported to the cloud printing service can be reduced while maintaining an acceptable level of feedback. This may reduce the cost of the cloud resources associated with implementing the cloud printing service on a cloud-computing platform, and may also reduce the network bandwidth requirements between on-premises equipment and the cloud printing service.

In an embodiment (also referred to as aspects), an apparatus comprises a cloud print mediator configured to communicatively couple to a cloud printing service provisioned on a cloud-computing platform, and to communicatively couple to a printer. The cloud print mediator comprises at least one processor and memory. The at least one processor is configured to cause the cloud print mediator at least to receive a print job from the cloud printing service, submit the print job to the printer, receive status messages from the printer regarding processing of the print job, identify throttling criteria that defines one or more conditions where status notifications are allowed to be reported to the cloud printing service, and perform status notification throttling based on the throttling criteria to regulate the status notifications reported to the cloud printing service in response to the status messages received from the printer.

In an embodiment, a method of throttling status notifications to a cloud printing service is disclosed. The method comprises receiving a print job from the cloud printing service, submitting the print job to a printer, receiving status messages from the printer regarding processing of the print job, identifying throttling criteria that defines one or more conditions where status notifications are allowed to be reported to the cloud printing service, and performing status notification throttling based on the throttling criteria to regulate the status notifications reported to the cloud printing service in response to the status messages received from the printer.

Other embodiments may include computer readable media, other systems, or other methods as described below.

The above summary provides a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the present disclosure are now described, by way of example only, and with reference to the accompanying drawings. The same reference number represents the same element or the same type of element on all drawings.

FIG. 1 illustrates a cloud printing architecture.

FIGS. 8A-8C are flow charts illustrating a method of throttling status notifications in an illustrative embodiment.

DETAILED DESCRIPTION

Figure 2:
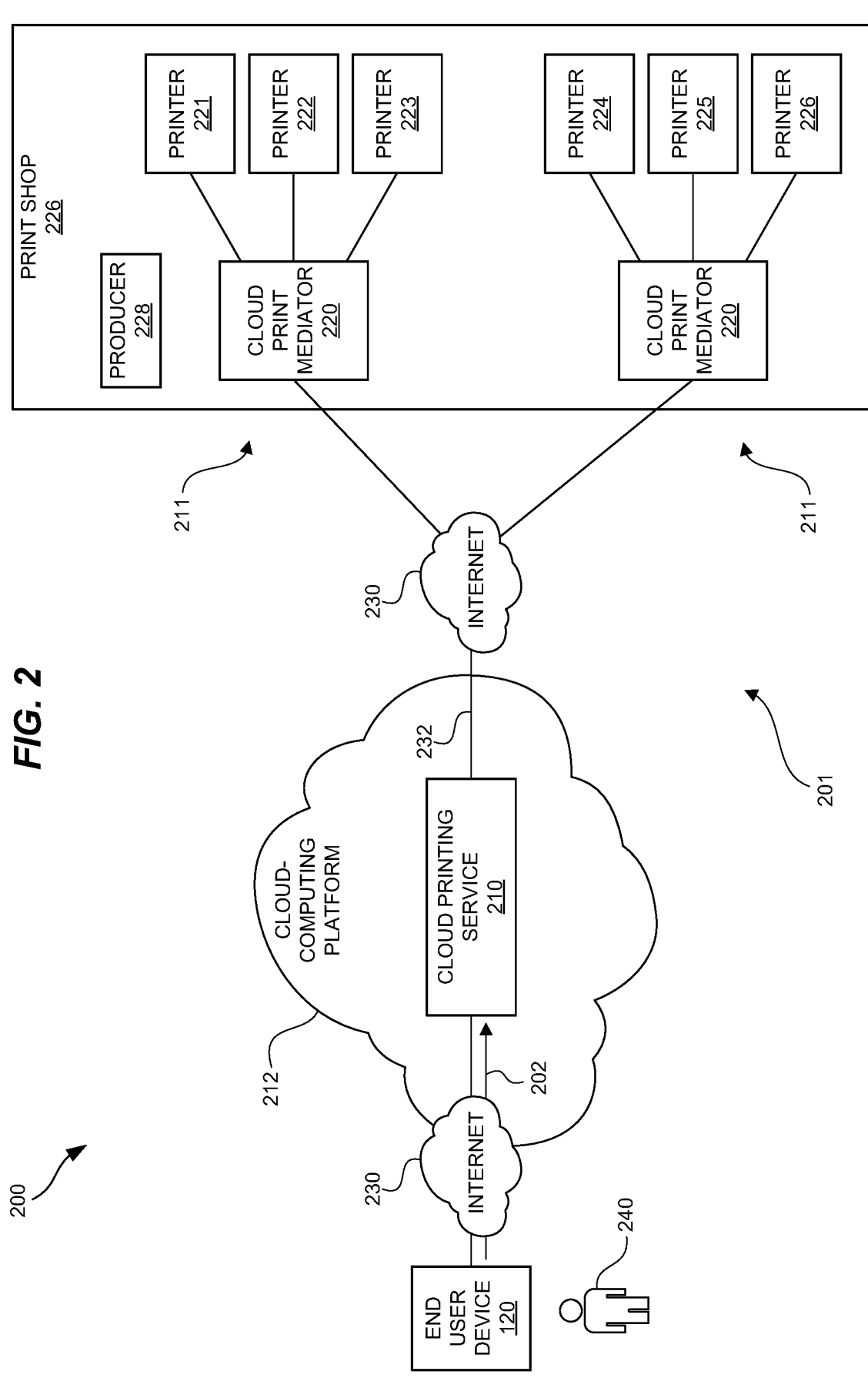
FIG. 2 illustrates another cloud printing architecture in an illustrative embodiment.

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
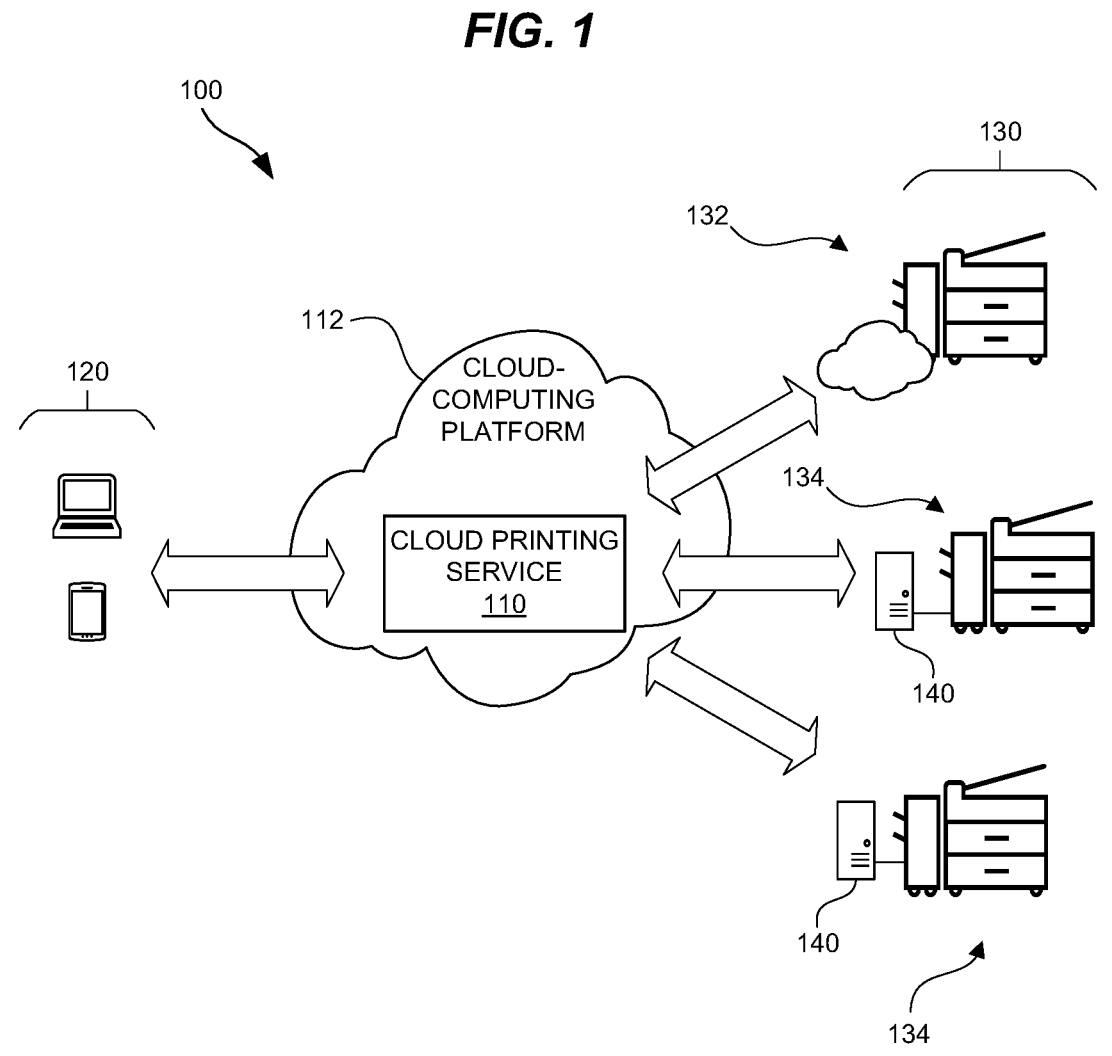

FIG. 1 illustrates a cloud printing architecture 100. Cloud printing architecture 100 comprises a cloud printing service 110 implemented on a cloud computing platform 112. Cloud-computing allows users access to a variety of services over an internet connection. Some examples of cloud-computing platform 112 may comprise Amazon Web Services (AWS), Google Cloud, Microsoft Azure, etc. Cloud printing service 110 connects end user devices 120 (e.g., a smartphone, laptop, tablet, personal computer (PC), etc.) with one or more network-connected printers 130. A printer 130 used in cloud printing architecture 100 may comprise a cloud-ready or cloud-enabled printer 132 configured to communicate with the cloud printing service 110. A printer 130 used in cloud printing architecture 100 may comprise a non-cloud-enabled or legacy printer 134 that uses a cloud print mediator 140 to communicate with the cloud printing service 110.

When an end user device 120 is remote from a printer 130 (i.e., not directly or physically connected), the cloud printing service 110 acts as an intermediary to receive a print job from the end user device 120, and submit the print job to the printer 130. For example, cloud printing service 110 may be used for consumer-based cloud printing, where end user devices 120 of an entity submit print jobs through the cloud printing service 110 to a printer 130 owned by the entity. Cloud printing service 110 may be used for professional or commercial cloud printing, where end user devices 120 submit print jobs through the cloud printing service 110 to printers 130 implemented at production facilities (e.g., corporate facilities, commercial facilities, etc.). One benefit is a user is able to submit print jobs from virtually anywhere an internet connection is available.

FIG. 2 illustrates another cloud printing architecture 200 in an illustrative embodiment. In this embodiment, cloud printing architecture 200 comprises a cloud printing service 210 implemented on a cloud computing platform 212, and the cloud printing service 210 is configured for professional, commercial, production, or industrial printing. Commercial printing may be performed by Print Service Providers (PSP) or other providers that offer printing services to users/customers in exchange for monetary compensation. For example, a PSP may offer printing services for advertising or marketing materials, product manuals, books, invoices/bills, blueprints, mailings, etc. In general, an owner or operator of a PSP may be referred to as a producer 228 that subscribes to the cloud printing service 210. A PSP may own or operate a variety of printing equipment, referred to generally as a print shop 226. In FIG. 2, print shop 226 includes one or more printers 221-226 and/or other print equipment (e.g., post-print devices, finishing devices, etc.). A printer is an image forming apparatus that performs image formation (printing) on a recording medium on the basis of print data received from a source. Although not shown in FIG. 2, a printer 221-226 generally includes a print controller and one or more print engines. The print controller receives a printer-compliant print stream (e.g., PDL-compliant data), generates rasterized data from the printer-compliant print stream, and transmits the rasterized data to one or more print engines, which mark a print media with the rasterized data. The print engine may use a variety of marking materials for marking a print media, such as ink (e.g., water, solvent, oil, or UV-curable), oil-based paints, additive manufacturing materials, toner, etc. The print media may comprise any type of material upon which ink or another type of marking material is applied, such as paper, plastic, card stock, transparent sheets, a substrate for 3D printing, cloth, etc.

Print shop 226 may implement multiple printers of the same type, or may implement different types of printers depending on needs of the customers. For example, one or more of the printers 221-226 may comprise a production printer (e.g., continuous-feed inkjet printer, a cut-sheet printer, etc.), a desktop printer, a 3D printer, a plotter or wide-format printer, etc. One or more printers 221-226 may be configured to print on different types or forms of print media, such as standard weight paper, glossy or matte stock, cut-sheet, continuous-forms, etc. One or more printers 221-226 may be configured to print on different media sizes, such as letter, legal, A4, extra-large, etc. One or more printers 221-226 may be configured to print in different colors, such as color or monochrome. One or more printers 221-226 may be configured with different finishing or post-print options, such as glosses or textures, binding, cutting/trimming, embossing, laminating, etc. Printers 221-226 are shown as being at a common location in the example of FIG. 2, but printing equipment may be distributed among multiple, different locations in other examples.

Cloud printing architecture 200 in FIG. 2 may be considered a hybrid cloud architecture 201 that combines the infrastructure of a public cloud (illustrated by cloud-computing platform 212), and on-ground or on-premise infrastructure 211. In an embodiment, the on-premise infrastructure 211 comprises the printers 221-226 and one or more cloud print mediators 220, which may collectively be referred to as a print system. In general, "on-premises" means that the infrastructure exists on-site in contrast to being hosted off-site, such as in a public cloud. In an on-premise infrastructure 211, an entity owns the resources of the infrastructure (e.g., computing resources, networking, storage, software, etc.), and/or has full control over the resources. A cloud print mediator 220 is an information processing apparatus, and comprises a type of on-premise equipment configured to interface one or more printers 221-226 with a cloud printing service 210. As will be described in more detail below, cloud print mediator 220 is communicatively coupled to a cloud printing service 210, such as over a secure connection, to receive print job information. Cloud print mediator 220 is also communicatively coupled to one or more printers 221-226. For example, cloud print mediator 220 may be directly connected to one or more printers 221-226 via wired or wireless connections. Cloud print mediator 220 is configured to communicate with the printers 221-226 to submit print jobs to the printers 221-226, to receive status messages or other data from the printers 221-226, etc.

At a high level, a user 240 (or customer) is able to submit a print job 202 (comprising one or more job files, an associated job ticket, etc.) to the cloud printing service 210 through an end user device 120 (also referred to as a host device). The cloud printing service 210 pre-processes the print job 202 (also referred to as preflight) to confirm that the job files are present, valid, correctly formatted, and/or of the desired type, and correct any potential problems. The cloud printing service 210 may then identify or select one or more destinations for the print job 202 (e.g., one or more of the printers 221-226, a hot folder, etc.), and send the print job 202 to the destination(s). For example, cloud printing service 210 may send the print job 202 to a cloud print mediator 220 for printing on a printer 221 under its domain (i.e., supervised by the cloud print mediator 220). Cloud print mediator 220, in turn, submits the print job 202 to the printer 221.

Cloud print mediator 220 is shown in FIG. 2 as being able to communicate with the cloud printing service 210 over a network, such as the internet 230. Likewise, end user device 120 is shown as being able to communicate with the cloud printing service 210 over the internet 230. The internet 230 as referred to herein is a system of interconnected computer networks that uses the Internet protocol suite (e.g., TCP/IP)

to communicate between networks and devices, although other protocols may be developed in the future.

Figure 3:
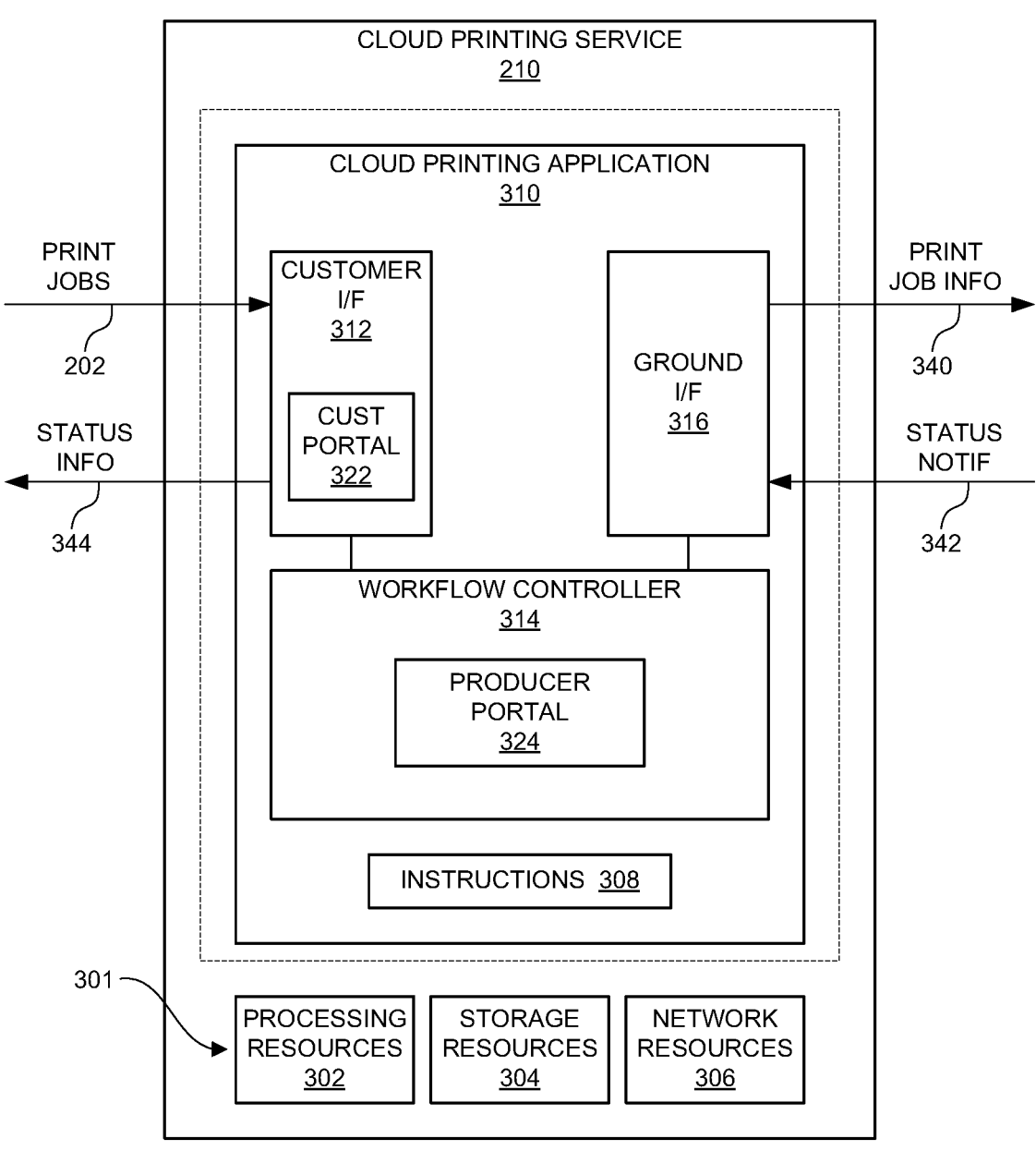
FIG. 3 is a block diagram of a cloud printing service in an illustrative embodiment.

FIG. 3 is a block diagram of a cloud printing service 210 in an illustrative embodiment. To implement the cloud printing service 210, cloud resources 301 are provisioned in a cloud-computing environment (e.g., AWS), such as processing resources 302, storage resources 304, and/or network resources 306, although other resources are considered herein. A cloud printing application 310 may be built or executed on the provisioned resources with instructions 308, programming, code, etc. In an embodiment, cloud printing application 310 provides a user or customer interface (I/F) 312, a workflow controller 314, and a ground interface 316.

Figure 4:
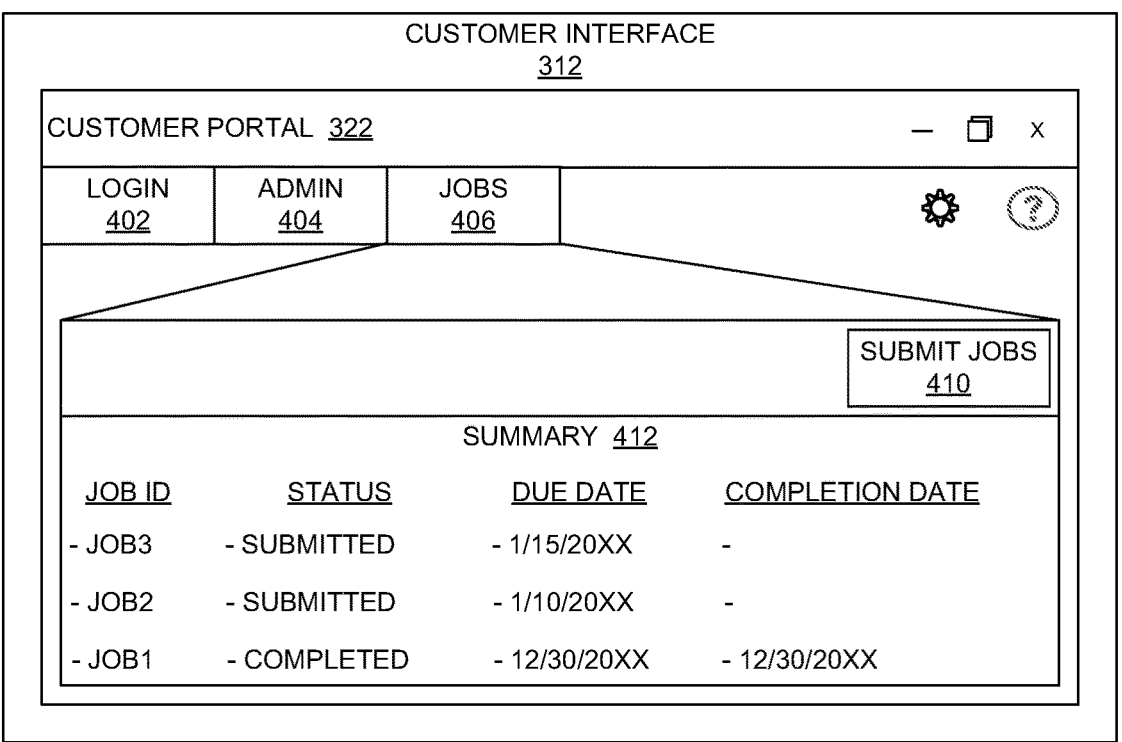
FIG. 4 is a block diagram of a customer portal in an illustrative embodiment.

Customer interface 312 is a module or component of the cloud printing service 210 that interacts with users 240. For example, customer interface 312 may receive print jobs 202 submitted by users 240 to the cloud printing service 210, such as through an end user device 120. Customer interface 312 may provide status information 344 for the print jobs 202 to user 240. In an embodiment, customer interface 312 may provide a website, a portal, a dashboard, a Graphical User Interface (GUI), or some other digital or graphical interface configured to interact with a user 240. For example, customer interface 312 may provide a customer portal 322 that allows a user 240 access to the cloud printing service 210. Cloud printing application 310 may be implemented in a multi-tenant cloud environment that is used by multiple different customers. Thus, each customer may be provided with a separate, secure space for accessing the cloud printing service 210 through customer portal 322. FIG. 4 is a block diagram of a customer portal 322 in an illustrative embodiment. Customer portal 322 may include icons, graphic representations or graphical elements, windows, screens, pages, etc., for interacting with a user 240. For example, customer portal 322 may provide a login page 402 (or window, screen, icon, etc.) configured to authenticate a user 240 for the cloud printing service 210. Customer portal 322 may provide an administration page 404 configured to allow a user 240 to define settings for the cloud printing service 210. Customer portal 322 may provide a jobs page 406 configured to allow a user 240 to manage print jobs 202 within the cloud printing service 210. For example, jobs page 406 may comprise a submit jobs graphical element 410 or button selectable by the user 240 to submit one or more print jobs 202 to the cloud printing service 210. Jobs page 406 may also comprise a summary graphical element 412 summarizing one or more print jobs 202 submitted to the cloud printing service 210, such as a job identifier (ID) or name, status information, a due date, a completion date, etc. However, jobs page 406 and/or customer portal 322 may have other formats or content as desired to manage print jobs 202 in the cloud printing service 210. In other embodiments, customer interface 312 may allow users 240 to submit print jobs 202 through email, File Transfer Protocol (FTP), or through another means.

Figure 5:
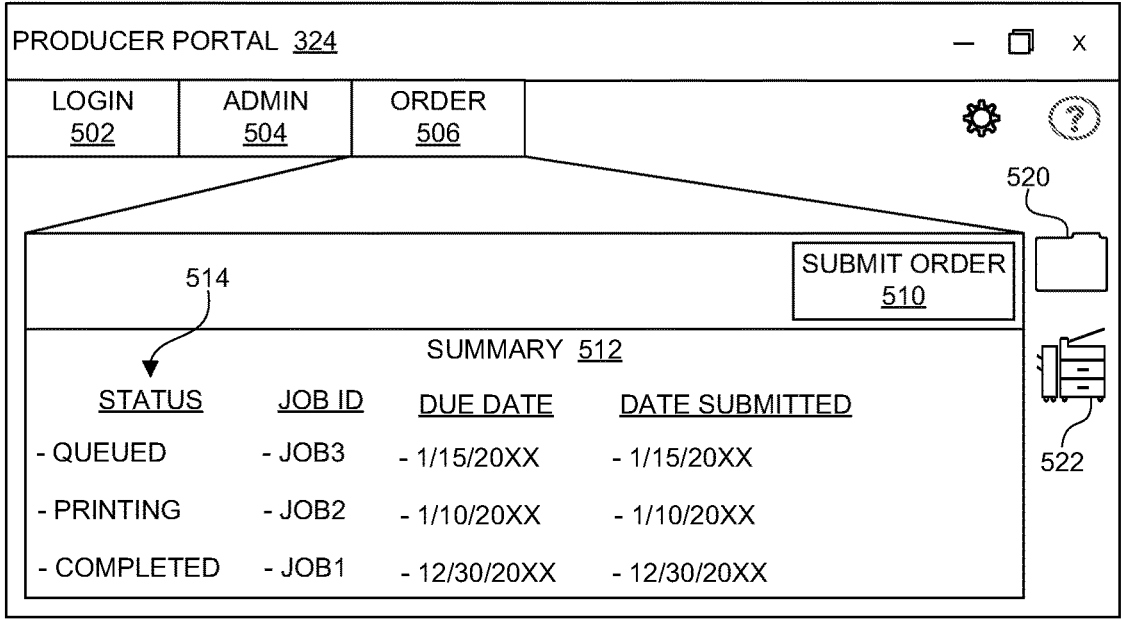
FIG. 5 is a block diagram of a producer portal in an illustrative embodiment.

In FIG. 3, workflow controller 314 is configured to manage workflows for print jobs 202 submitted to the cloud printing service 210. For example, workflow controller 314 may be configured to scan incoming job files for malware, extract metadata from the job files, convert the job files to a standard format (e.g., .pdf) if needed, preflight the job files to identify any potential problems, identify printers 221-226 available and/or capable of printing print jobs 202, schedule print jobs 202 directed to specific printers 221-226 (e.g., based on input from a producer 228), etc. In an embodiment, workflow controller 314 may provide a website, a portal, a dashboard, a GUI, or some other digital or graphical interface configured to interact with a producer 228 (e.g., a PSP operator). For example, workflow controller 314 may provide a producer portal 324 that allows a producer 228 access to the cloud printing service 210. FIG. 5 is a block diagram of a producer portal 324 in an illustrative embodiment. For example, producer portal 324 may provide a login page 502 (or window, screen, icon, etc.) configured to authenticate a producer 228 for the cloud printing service 210. Producer portal 324 may provide an administration page 504 configured to allow a producer 228 to define settings for the cloud printing service 210. Producer portal 324 may provide an order page 506 configured to allow a producer 228 to manage and/or order printing of print jobs 202 through the cloud printing service 210. For example, order page 506 may comprise a submit order graphical element 510 or button selectable by the producer 228 to print one or more print jobs 202 from the cloud printing service 210 to one or more printers 221-226. Producer 228 may drag and drop print jobs 202 into a hot folder icon 520, a printer icon 522 associated with a specific printer 221-226, etc. Order page 506 may also comprise a summary graphical element 512 summarizing one or more print jobs 202 submitted through the cloud printing service 210, such as status information 514, a job ID or name, a due date, a submission date, etc. Of note, the status information 514 is updated based on the status notifications provided by cloud print mediators 220 to the cloud printing service 210. Although one example is shown, order page 506 and/or producer portal 324 may have other formats or content as desired.

In FIG. 3, ground interface 316 is a module or component of the cloud printing service 210 that interacts with on-premise infrastructure 211, such as one or more cloud print mediators 220. For example, ground interface 316 may submit a print job 202, a print request, an instruction, control information, etc., (generally referred to as print job information 340) from the cloud printing service 210 to a cloud print mediator 220 regarding a print job 202 scheduled for printing at an associated printer 221-226 under the domain of the cloud print mediator 220. Ground interface 316 may receive status notifications 342 (also referred to as status updates) from a cloud print mediator 220 regarding the status of print jobs 202. Workflow controller 314 may use the status notifications 342 to update the status information 514 presented at the producer portal 324, and customer interface 312 may use the status notifications 342 to provide status information 344 to the user 240 through customer portal 322.

Figure 6:
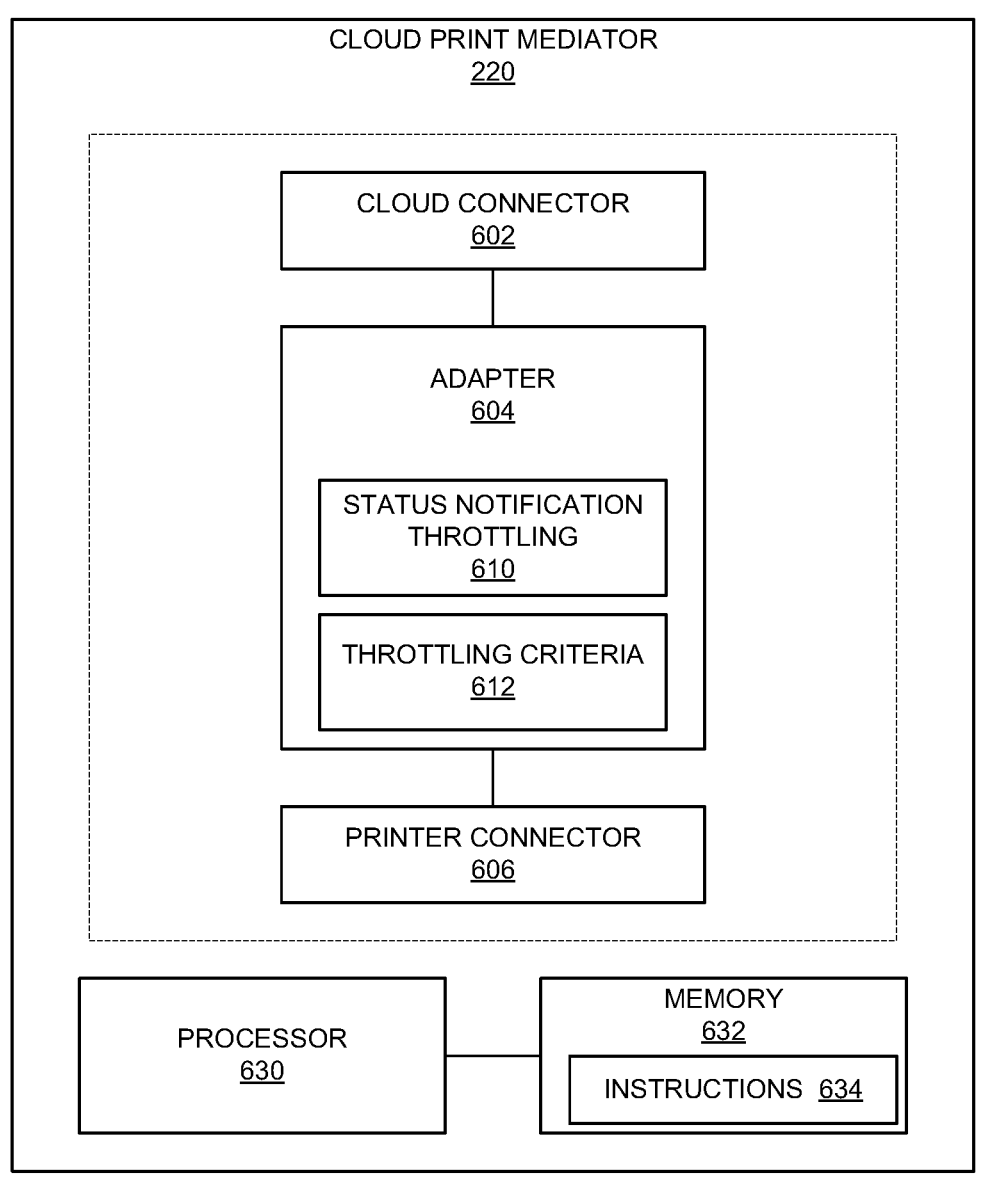
FIG. 6 is a block diagram of a cloud print mediator in an illustrative embodiment.

FIG. 6 is a block diagram of a cloud print mediator 220 in an illustrative embodiment. In an embodiment, cloud print mediator 220 includes the following subsystems: a cloud connector 602, an adapter 604, and a printer connector 606. Cloud connector 602 is an information processing apparatus comprising circuitry, logic, hardware, an application, means, etc., configured to communicate with a cloud printing service 210, such as ground interface 316. Cloud connector 602 is configured to provide a secure connection with the cloud printing service 210, to manage communication with the cloud printing service 210, etc. For example, cloud connector 602 may exchange communications with the cloud printing application 310 over a network connection 232 (see FIG. 2) via the internet 230, such as messages, data, print job information 340, status notifications 342, etc. Cloud connector 602 may use a variety of protocols for communication, such as an Application Programming Interface (API), data and/or network management protocols, a standard messaging protocol, etc. Functions or tasks of cloud connector 602 may include receiving or retrieving print jobs 202 submitted by the cloud printing service 210, such as one or more job files (e.g., .pdf files), a job ticket (e.g., Job Definition Format (JDF) job ticket) describing attributes for printing the print job 202 (e.g., media size, number of copies, color or greyscale, resolution, etc.), and/or other job-related information. Functions or tasks of cloud connector 602 may also include reporting status notifications 342 regarding the print jobs 202 and/or printers 221-226 to the cloud printing service 210.

Printer connector 606 is an information processing apparatus comprising circuitry, logic, hardware, an application, means, etc., configured to communicate with printers 221-226 and/or other printing equipment. Printer connector 606 may use a variety of protocols for communication. For example, printer connector 606 may exchange communications with printers 221-226 based on a native printer interface protocol of the printers 221-226, an API (e.g., Fiery API), TCP/IP, Line Printer Remote (LPR) protocol, Internet Printing Protocol (IPP), Postscript over a Transmission Control Protocol (TCP) port, Hypertext Transfer Protocol (HTTP)/HTTPS, Simple Network Management Protocol (SNMP), Job Messaging Format (JMF) protocol, etc. Functions or tasks of printer connector 606 may include submitting print jobs 202 to printers 221-226, receiving or retrieving status messages from the printers 221-226, etc.

Adapter 604 is communicatively coupled between cloud connector 602 and printer connector 606. Adapter 604 is an information processing apparatus comprising circuitry, logic, hardware, an application, means, etc., configured to queue print jobs 202 received through cloud connector 602, for submission to printer connector 606. For example, cloud printing service 210 can scale easily and may be able to send print jobs 202 much faster than the printer connector 606 and/or the printers 221-226 can consume the print jobs 202. Adapter 604 may therefore act as a buffer to allow the cloud printing service 210 to run as fast as it can without imposing any ground-side limitations. Adapter 604 is further configured to manage status messages received from printers 221-226 through printer connector 606.

One or more of the subsystems of cloud print mediator 220 may be implemented on a hardware platform comprised of analog and/or digital circuitry. One or more of the subsystems of cloud print mediator 220 may be implemented on a processor 630 that executes instructions 634 stored in memory 632. A processor 630 comprises an integrated hardware circuit configured to execute instructions 634 to provide the functions of cloud print mediator 220. Processor 630 may comprise a set of one or more processors or may comprise a multi-processor core, depending on the particular implementation. Memory 632 is a non-transitory computer readable medium for data, instructions, applications, etc., and is accessible by processor 630. Memory 632 is a hardware storage device capable of storing information on a temporary basis and/or a permanent basis. Memory 632 may comprise a random-access memory, or any other volatile or non-volatile storage device.

Cloud print mediator 220 may comprise various other components not specifically illustrated in FIG. 6. In an embodiment, cloud print mediator 220 may be implemented on a separate platform from one or more printers, such as for legacy printers 134. In an embodiment, cloud print mediator 220 may be implemented on or integrated in a common or same platform as a printer, such as for a cloud-ready or cloud-enabled printer 132.

Figure 7A:
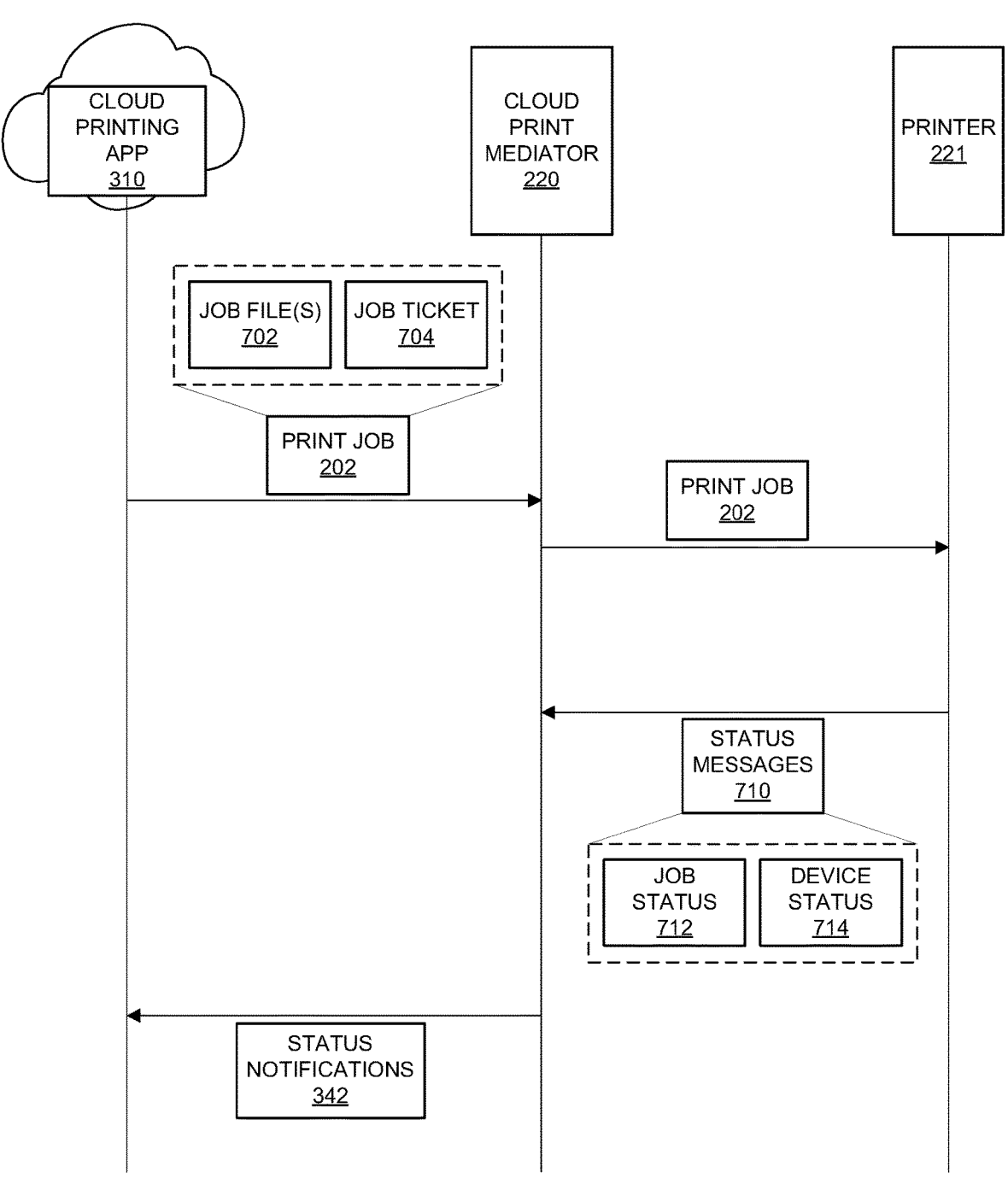
FIGS. 7A-7C illustrate communications involving a cloud printing service in illustrative embodiments.
Figure 7B:
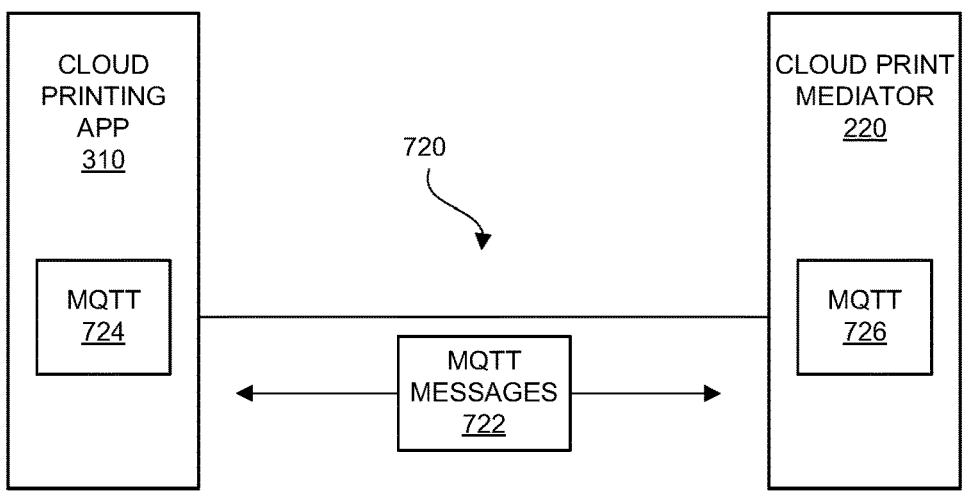
Figure 7C:
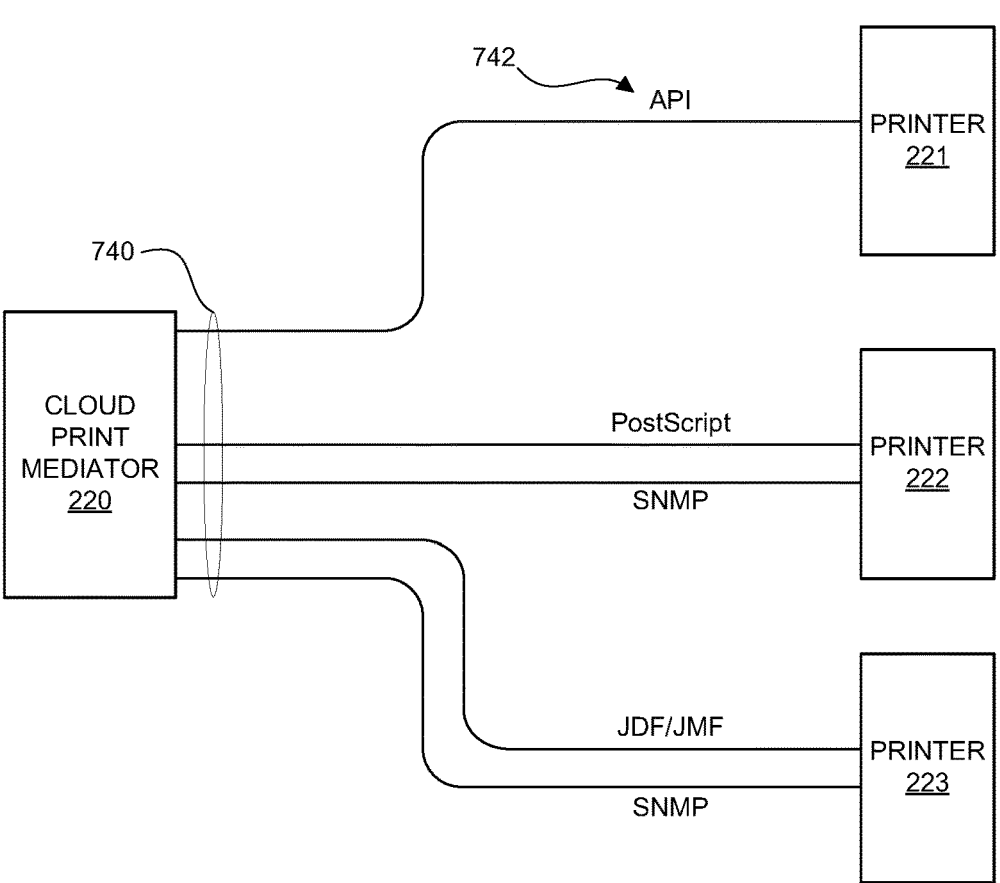

FIGS. 7A-7C illustrate communications involving a cloud printing service 210 in illustrative embodiments. In FIG. 7A, cloud printing application 310 submits a print job 202 to cloud print mediator 220, and cloud print mediator 220 in turn submits the print job 202 to a printer 221. A print job 202 may include one or more job files 702, a job ticket 704, and/or other print job information 340. In submitting the print job 202 to cloud print mediator 220, cloud printing application 310 may send a print request, the job file(s) 702, job ticket 704, and/or other print job information 340 to cloud print mediator 220 over a secure connection. In another example, cloud printing application 310 may store the job file(s) 702, job ticket 704, and/or other print job information at a particular storage location, and may also send a print request to cloud print mediator 220 specifying a path (e.g., Uniform Resource Locator (URL)) for the job file(s) 702, job ticket 704, etc. In response, cloud print mediator 220 may retrieve the job file(s) 702, job ticket 704, etc., from the storage location.

FIG. 7B illustrates connectivity between cloud printing application 310 and cloud print mediator 220 in an illustrative embodiment. In an embodiment, cloud printing application 310 and cloud print mediator 220 may communicate using Message Queuing Telemetry Transport (MQTT) protocol 720 to exchange MQTT messages 722. MQTT protocol 720 is a standards-based messaging protocol used for machine-to-machine communication. Thus, cloud printing application 310 (i.e., ground interface 316) may implement or include an MQTT module 724 configured to communicate via MQTT protocol 720. Likewise, cloud print mediator 220 (i.e., cloud connector 602) may implement or include an MQTT module 726 configured to communicate via MQTT protocol 720. Cloud print mediator 220, for example, may receive a print request for the print job 202 from the cloud printing application 310 via an MQTT message 722, which identifies the print job 202, indicates a storage location for the print job 202, and/or other information. Cloud print mediator 220 may report or send status notifications 372 for the print job 202 to the cloud printing application 310 via MQTT messages 722. Although MQTT protocol 720 may be used in one embodiment, other protocols may be used between cloud printing application 310 and cloud print mediator 220.

Upon receiving the print job 202 as in FIG. 7A, cloud print mediator 220 may queue the print job 202, and send the print job 202 to the printer 221 over a printer connection. FIG. 7C illustrates connectivity between cloud print mediator 220 and printers 221-223 in an illustrative embodiment. Cloud print mediator 220 is communicatively coupled to a printer 221-223 over one or more printer connections 740 (i.e., wired or wireless connections). Cloud print mediator 220 may communicate with a printer 221-223 using a variety of printer connection types or protocols, such as an API 742, SNMP, JMF, and/or another protocol to provide the print job 202 and any another job-related information to a printer 221-223, receive updates from a printer 221-223, etc. As an example, printer connector 606 may use an API 742 to send a job file (e.g., a .pdf file), a list of attribute value pairs that represents job ticket settings in that particular API's representation, and or other job data to a printer 221. Printer connector 606 may also use the API 742 to gather information and/or status updates from the printer 221. In another example, printer connector 606 may send the print job 202 to printer 222 as Postscript job data. In a Postscript interface, the job ticket settings are converted to Postscript and embedded in the job data. Printer connector 606 may use SNMP, for example, to gather information and/or status updates from the printer 222. For instance, printer connector 606 may subscribe for SNMP alerts (called Traps), may poll printer 222 for status updates (e.g., job and/or printer updates), etc. In another example, printer connector 606 may use JDF/JMF to submit job data (i.e., job file and job ticket) to a printer 223. Printer controller 606 may use JMF to gather information and/or status updates. For instance, printer connector 606 may subscribe for JMF alerts (called signals), may poll printer 223 for status updates (e.g., job and/or printer updates), etc. Printer connector 606 may alternatively use SNMP to gather information and/or status updates from the printer 223. FIG. 7C illustrates some examples of protocols used between cloud print mediator 220 and printers 221-223, and other printer connection types and protocols are considered herein.

In processing print jobs 202, for example, printers 221-226 generate status messages that are received at cloud print mediator 220. In FIG. 7A, for example, cloud print mediator 220 receives status messages 710 from printer 221, such as when processing or consuming the submitted print job 202. For example, cloud print mediator 220 may subscribe to receive status messages 710 from a printer 221, may poll a printer 221 for status messages 710, etc. Status messages 710 may comprise a job status 712 indicating details of printing the print job 202, a device status 714 indicating an operating state of the printer 221, and/or other status information or updates. Cloud print mediator 220 processes or interprets the status messages 710, and reports status notifications 342 to cloud printing service 210. For example, cloud print mediator 220 may format an MQTT message 722 containing the status notification 342.

The number of status messages 710 generated by a printer 221-226 can be quite voluminous. At the same time, the number of status notifications 342 reported by cloud print mediator 220 to the cloud printing service 210 may have an associated cost in terms of consumption of cloud resources 301 to handle the status notifications 342, bandwidth needed between cloud print mediator 220 and the cloud printing service 210, etc. In an embodiment, cloud print mediator 220 is configured or programmed to throttle, filter, or otherwise regulate the status notifications 342 reported to the cloud printing service 210.

In FIG. 6, adapter 604 is configured or programmed to perform status notification throttling 610 to restrict or limit the status notifications 342 that are uploaded to the cloud printing service 210. Adapter 604 stores throttling criteria 612 that defines one or more conditions where status notifications 342 are allowed or authorized to be reported to the cloud printing service 210. When receiving status messages 710 from a printer 221-226, adapter 604 processes the status messages 710 and the throttling criteria 612 to determine whether or not to trigger a status notification 342 to the cloud printing service 210. Thus, instead of sending a status notification 342 to the cloud printing service 210 each time a status message 710 is received from a printer 221, adapter 604 regulates the status notifications 342 that are reported. One technical benefit is status notification throttling 610 within adapter 604 acts to balance the benefit of reporting status notifications 342 to the cloud printing service 210 (i.e., sufficient feedback) with the cost of reporting. Thus, the overall cost of implementing the cloud printing service 210 on the cloud-computing platform 212 can be reduced. Also, since cloud print mediator 220 represents a one-time, upfront cost for the equipment and does not incur "per-message" costs, it is beneficial to implement status notification throttling 610 at the on-premise infrastructure 211.

Figure 8B:
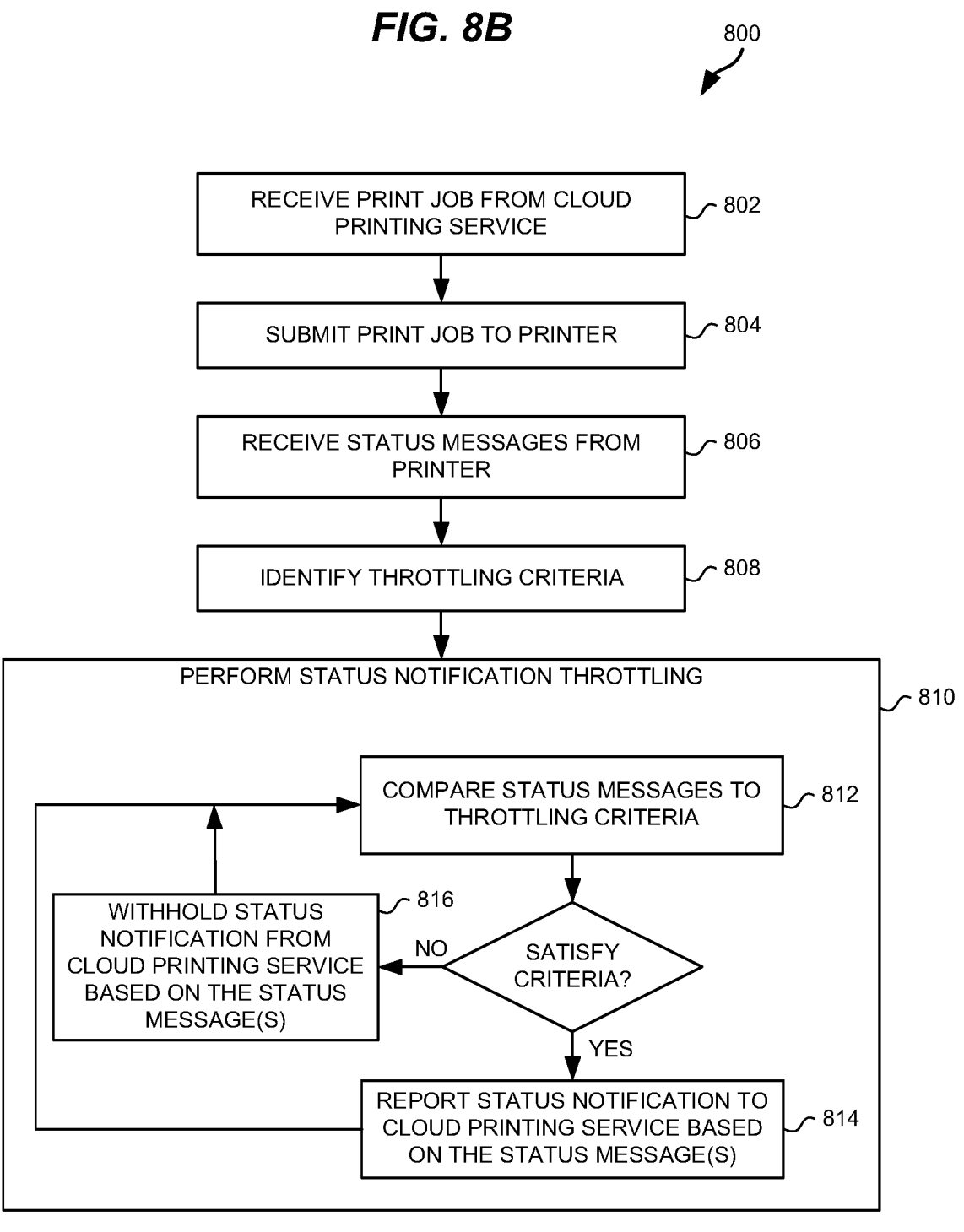
Figure 8C:
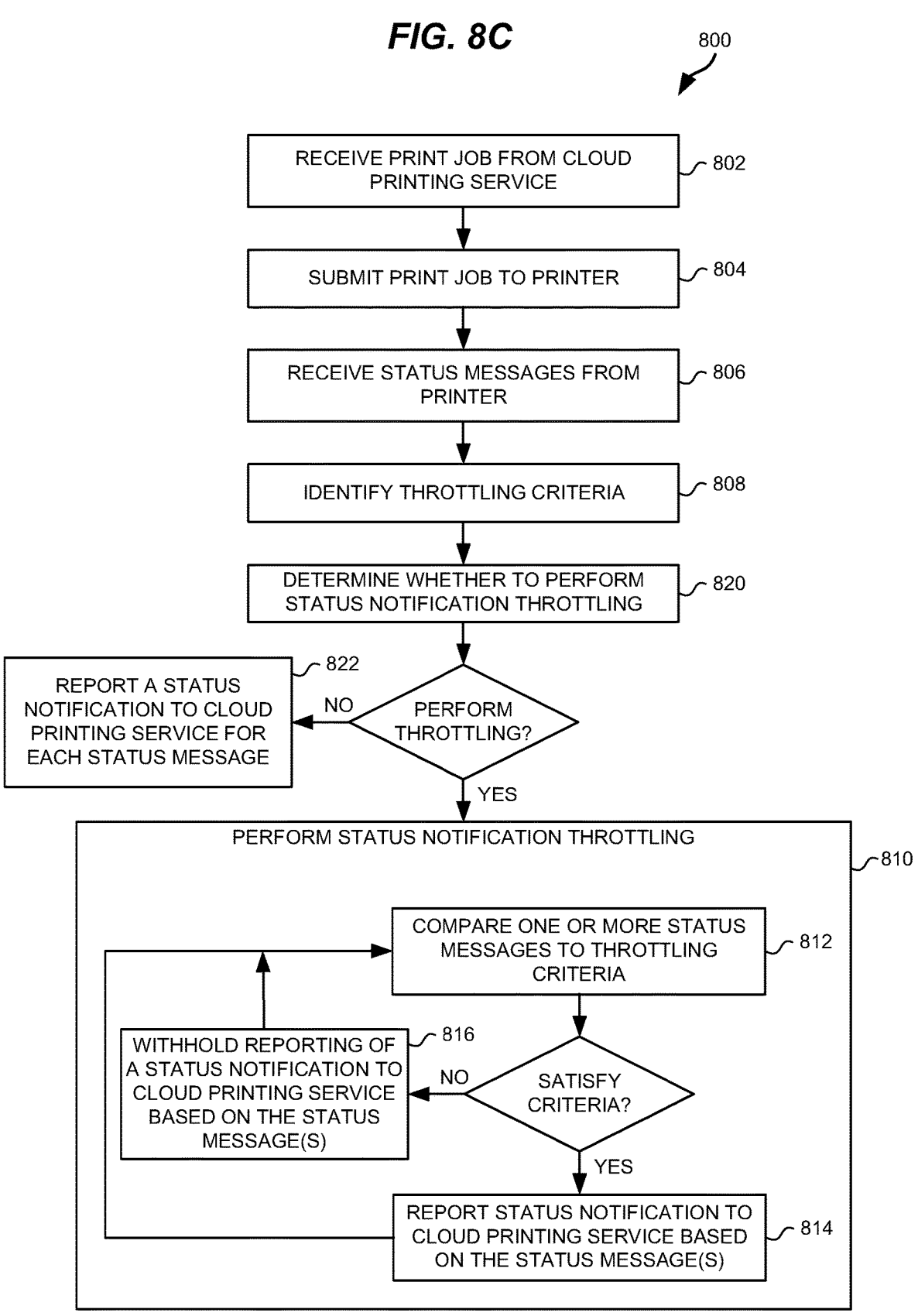

FIGS. 8A-8C are flow charts illustrating a method 800 of throttling status notifications 342 in an illustrative embodiment. The steps of method 800 will be described with reference to cloud print mediator 220 in FIG. 6, but those skilled in the art will appreciate that method 800 may be performed in other systems or devices. Also, the steps of the flow charts described herein are not all inclusive and may include other steps not shown, and the steps may be performed in an alternative order.

In FIG. 8A, cloud connector 602 receives a print job 202 from the cloud printing service 210 (step 802). Adapter 604 may process the print job 202 received by cloud connector 602 before forwarding to printer connector 606. Printer connector 606 then submits the print job 202 to a printer 221-226 (step 804), such as printer 221. Printer connector 606 receives status messages 710 from the printer 221 regarding processing of the print job 202 (step 806). For example, printer connector 606 may subscribe to the printer 221 to receive status messages 710 (optional step 830). In another example, printer connector 606 may poll the printer 221 to receive status messages 710 (optional step 832). Adapter 604 identifies throttling criteria 612 (step 808), and performs status notification throttling 610 based on the throttling criteria 612 to regulate status notifications 342 reported to the cloud printing service 210 in the response to status messages 710 received from the printer 221 (step 810). One technical benefit is the volume of status notifications 342 reported to the cloud printing service 210 can be controlled at cloud print mediator 220. This can advantageously reduce the cloud-side costs associated with processing the status notifications 342, while allowing for sufficient reporting to the cloud printing service 210.

Figure 9A:
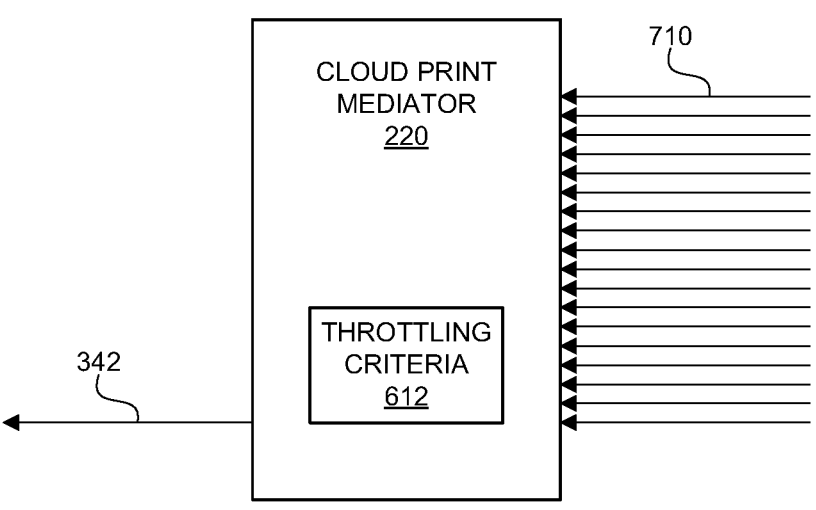
FIG. 9A is a diagram illustrating status notification throttling activated in an illustrative embodiment.

In an example, to perform status notification throttling 610 as in FIG. 8B, adapter 604 processes one or more of the status messages 710 and the throttling criteria 612 to determine whether to report a status notification 342 to the cloud printing service 210. FIG. 9A is a diagram illustrating status notification throttling 610 activated in an illustrative embodiment. Adapter 604 (through printer connector 606) receives a series of status messages 710 from the printer 221 over time. Adapter 604 interprets the received status messages 710 to determine whether to trigger a corresponding status notification 342. For example, adapter 604 may compare each of the status messages 710 to the throttling criteria 612 (step 812 of FIG. 8B). Based on the comparison, adapter 604 may determine whether a status notification 342 is allowed to be reported to the cloud printing service 210. When a status message 710 received from the printer 221 satisfies the throttling criteria 612 (e.g., satisfies one or more conditions defined in the throttling criteria 612), adapter 604 reports a status notification 342 to the cloud printing service 210 (step 814). For example, adapter 604 may instruct cloud connector 602 to send a status notification 342 to cloud printing application 310, such as in one or more MQTT messages 722. The content of the status notification 342 may be based on the content of the status message 710 that triggered the status notification 342 (i.e., the status message 710 that satisfied the throttling criteria 612). As adapter 604 may receive and interpret multiple status messages 710 before triggering the status notification 342, the content of the status notification 342 may be based on the content of multiple status messages 710.

When a status message 710 does not satisfy the throttling criteria 612 (e.g., no conditions match), adapter 604 withholds a status notification 342 from the cloud printing service 210 (step 816). One technical benefit is the adapter 604 controls when status notifications 342 are reported to the cloud printing service 210 based on throttling criteria 612.

Figure 10A:
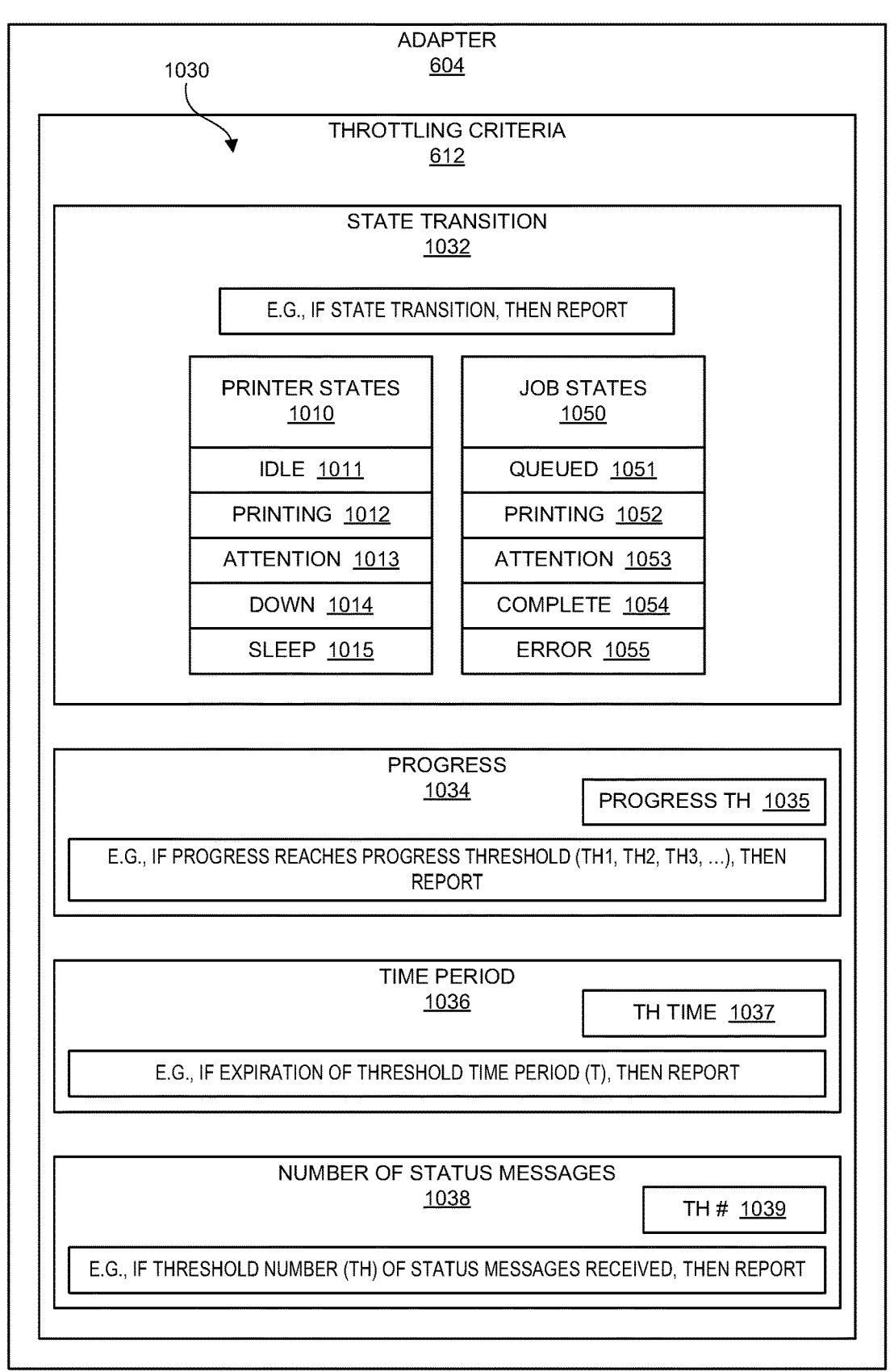
FIGS. 10A-10B illustrate throttling criteria in an illustrative embodiment.
Figure 10B:
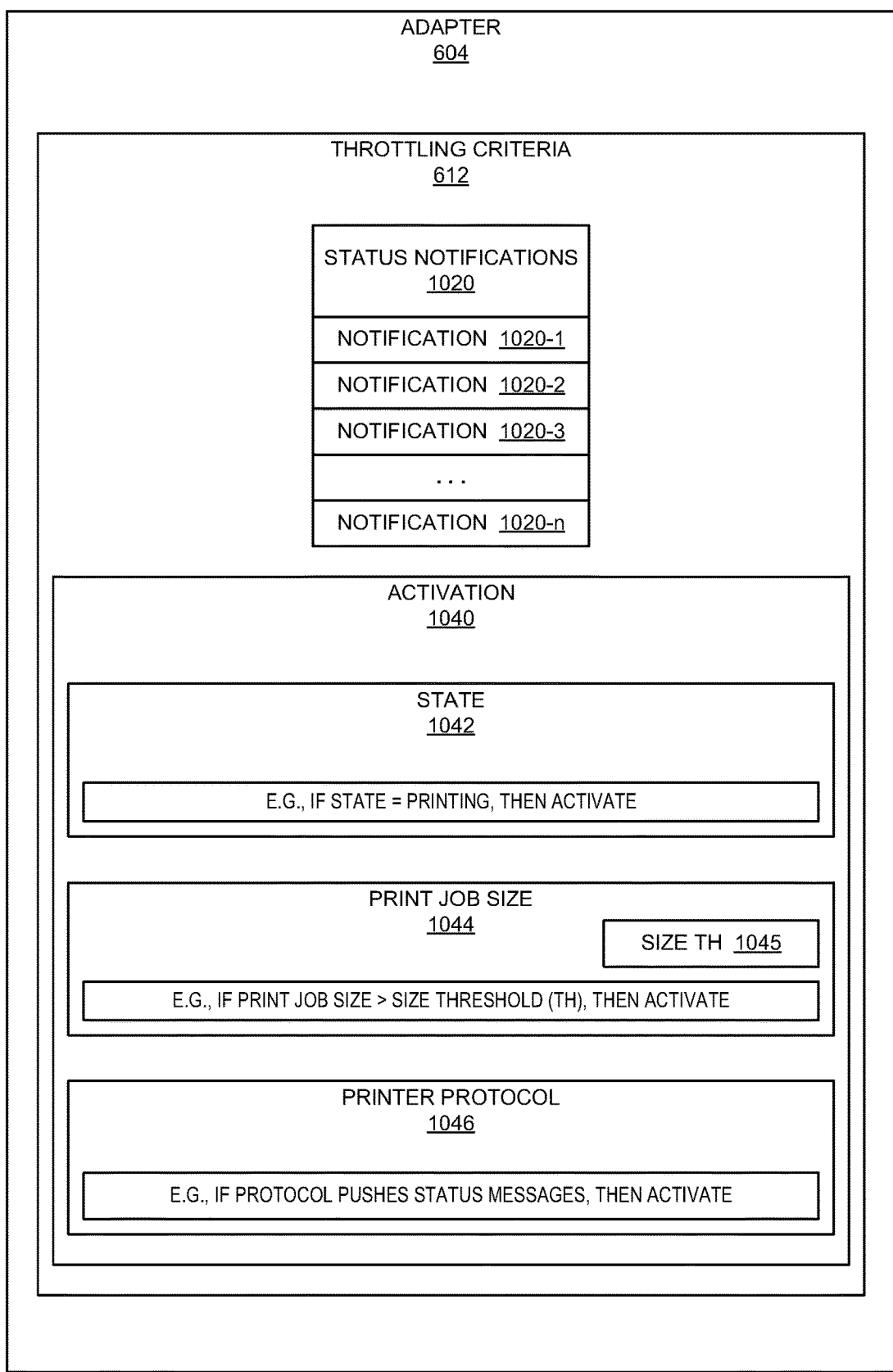

FIGS. 10A-10B illustrate throttling criteria 612 in an illustrative embodiment. Throttling criteria 612 may comprise a variety of data or information used in status notification throttling 610. In FIG. 10A, throttling criteria 612 comprise one or more conditions 1030 where status notifications are allowed or authorized to be reported to the cloud printing service 210. In an example, a condition 1030 may comprise a state transition condition 1032 that stipulates reporting of a status notification 342 is allowed or authorized when a status message 710 indicates a state transition at a printer. Adapter 604 processes the received status messages 710 from the printer 221 to determine whether the content of a status message 710 indicates a state transition, and triggers a status notification 342 when the content of a status message 710 indicates a state transition. For example, the throttling criteria 612 may also define a predefined set of printer states 1010 for a printer. In an embodiment, the printer states 1010 may comprise an idle state 1011 where a printer is idle, a printing state 1012 where a print job is printing at a printer, an attention-required state 1013 where operator intervention is required at a printer, an error or down state 1014 where an error is detected at a printer, and a sleep state 1015 where a printer enters a lower-power state after a set period of inactivity. The predefined set of printer states 1010 may include any combination of the example states 1011-1015 and/or other states. The throttling criteria 612 may also define a predefined set of job states 1050 for a print job. In an embodiment, the job states 1050 may comprise a queued state 1051 where a print job is queued for printing at a printer, a printing state 1052 where a print job is printing at a printer, an attention-required state 1053 where operator intervention is required, a complete state 1054 where printing of a print job is complete at a printer, and an error state 1055 where an error is detected in printing a job. The predefined set of job states 1050 may include any combination of the example states 1051-1055 and/or other states. The state transition condition 1032 may specify that reporting is allowed when a printer transitions from one of the predefined printer states 1010 to another, such as from the idle state 1011 to the printing state 1012, from the printing state 1012 to down state 1014, etc. The state transition condition 1032 may specify that reporting is allowed when a print job 202 transitions from one of the predefined job states 1050 to another, such as from the queued state 1051 to the printing state 1052, from the printing state 1052 to an error state 1055, etc.

In an example, a condition 1030 may comprise a progress condition 1034 that stipulates reporting of a status notification 342 is allowed or authorized when a status message 710 indicates that progress of printing a print job at the printer reaches one or more progress thresholds 1035. For instance, the progress condition 1034 may specify that reporting is allowed at certain percentage complete thresholds, such as 10%, 20%, 30%, or some percentage of completion. Adapter 604 therefore processes the received status messages 710 from the printer 221 to determine whether the progress of printing a print job reaches a progress threshold 1035, and triggers a status notification 342 when the progress threshold 1035 is reached.

In an example, a condition 1030 may comprise a time period condition 1036 that stipulates reporting of a status notification 342 is allowed or authorized periodically at expiration of a threshold time period 1037. For instance, the threshold time period 1037 may be one second, five seconds, ten seconds, one minute, etc. Adapter 604 monitors a time since last reporting of a status notification 342 to the cloud printing service 210, and triggers a status notification 342 at expiration of the threshold time period 1037.

In an example, a condition 1030 may comprise a number of status messages condition 1038 that stipulates reporting of a status notification 342 is allowed or authorized after receipt of a threshold number 1039 of the status messages 710 from a printer. For instance, the threshold number 1039 may be ten messages, one hundred messages, one thousand messages, etc. Adapter 604 counts the number of status messages 710 since last reporting of a status notification 342 to the cloud printing service 210, and triggers a status notification 342 when the threshold number 1039 of the status messages 710 is reached.

Although some examples of the conditions 1030 are provided above, other conditions 1030 are considered herein. One technical benefit is different types of throttling criteria 612 may be defined to manage reporting to a cloud printing service 210. Also, the throttling criteria 612 may be configurable to add flexibility to the status notification throttling 610.

In FIG. 10B, the throttling criteria 612 may define predefined status notifications 1020 (e.g., 1020-1, 1020-2, 1020-3, . . . , 1020-n). The predefined status notifications 1020 may be mapped to conditions 1030 defined in the throttling criteria 612, and the content of the predefined status notifications 1020 may therefore be related to a corresponding condition 1030. For example, the state transition condition 1032 may be mapped to one or more of the predefined status notifications 1020. When the state transition condition 1032 is satisfied, adapter 604 is configured to report the predefined status notification 1020 mapped to the state transition condition 1032. In another example, the progress condition 1034 may be mapped to one or more of the predefined status notifications 1020. When the progress condition 1034 is satisfied, adapter 604 is configured to report the predefined status notification 1020 mapped to the progress condition 1034. The predefined status notifications 1020 may have a predefined format for reporting responsive to a different condition 1030. One technical benefit is a configurable set of predefined status notifications 1020 may be used to manage reporting to a cloud printing service 210.

Status notification throttling 610 may be selectively activated in adapter 604, as illustrated in FIG. 8C. Adapter 604 determines whether to perform or activate status notification throttling 610 (step 820). For example, adapter 604 may receive a command or instruction from an operator, the cloud printing service 210, etc., indicating whether or not to perform status notification throttling 610 on status messages 710 received from printers 221-226. In an embodiment, adapter 604 may determine whether to perform or activate status notification throttling 610 based on the throttling criteria 612. In FIG. 10B, for example, the throttling criteria 612 may comprise one or more activation conditions 1040 for activating status notification throttling 610 within adapter 604. In an example, an activation condition 1040 may comprise a state condition 1042 that stipulates activation of status notification throttling 610 when a printer or print job is in one or more states. A printer may generate an increased number of status messages 710 while in a particular printer state 1010 or while a print job 202 is in a particular job state 1050 as compared to others. For instance, a printer may generate a much higher number of status messages 710 while in a printing state 1012 as opposed to an idle state 1011. Thus, the state condition 1042 may specify activation of status notification throttling 610 when a printer is in a printing state 1012 and/or when a print job 202 is in a printing state 1052.

In an example, activation of status notification throttling 610 may depend on one or more job characteristics of a print job 202. For example, an activation condition 1040 may comprise a print job size condition 1044 that stipulates activation of status notification throttling 610 when the size of a print job 202 exceeds a size threshold 1045. For instance, the size threshold 1045 may be ten megabytes, one gigabyte, ten gigabytes, etc. Smaller print jobs 202 may print relatively fast (e.g., less than a minute), so the volume of status messages 710 is small compared to large print jobs 202. For large print jobs 202, the volume of status messages 710 may be high, and it may be beneficial to activate status notification throttling 610.

In an example, an activation condition 1040 may comprise a printer protocol condition 1046 that stipulates activation of status notification throttling 610 when a printer uses a protocol that pushes status messages. For instance, cloud print mediator 220 may subscribe to a printer to be notified of status messages 710. Due to the subscription, the printer pushes the status messages 710 to the cloud print mediator 220. Pushing of status messages 710 is contrasted with cloud print mediator 220 pulling status messages 710 from a printer. When pulling status messages 710, cloud print mediator 220 may have control over how many status messages 710 are received. However, when a printer pushes status messages 710, cloud print mediator 220 has little or no control over how many status messages 710 are received as the printer determines the rate at which the status messages 710 are pushed. Thus, adapter 604 may activate status notification throttling 610 in situations where a printer pushes status messages 710 to cloud print mediator 220.

Although some examples of activation conditions 1040 are provided above, other activation conditions 1040 are considered herein. One technical benefit is status notification throttling 610 may be turned ON and OFF at the adapter 604 as desired.

Figure 9B:
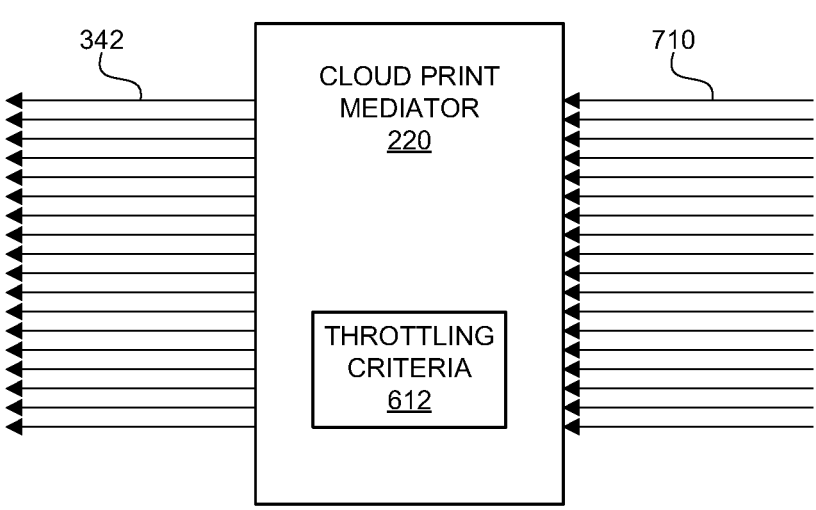
FIG. 9B is a diagram illustrating status notification throttling deactivated in an illustrative embodiment.

In FIG. 8C, when adapter 604 determines that status notification throttling 610 is activated, adapter 604 performs status notification throttling 610 as described above. When adapter 604 determines that status notification throttling 610 is deactivated, adapter 604 may report a status notification 342 for each status message 710 received from a printer (step 822). FIG. 9B is a diagram illustrating status notification throttling 610 deactivated in an illustrative embodiment. As in FIG. 9A, adapter 604 (through printer connector 602) receives a series of status messages 710 from the printer 221 over time. Instead of regulating or limiting the status notifications 342 reported, adapter 604 reports a status notification 342 to the cloud printing service 210 each time a status message 710 is received from a printer. One technical benefit is adapter 604 provides flexibility in how status notifications 342 are reported to a cloud printing service 210.

Figure 11:
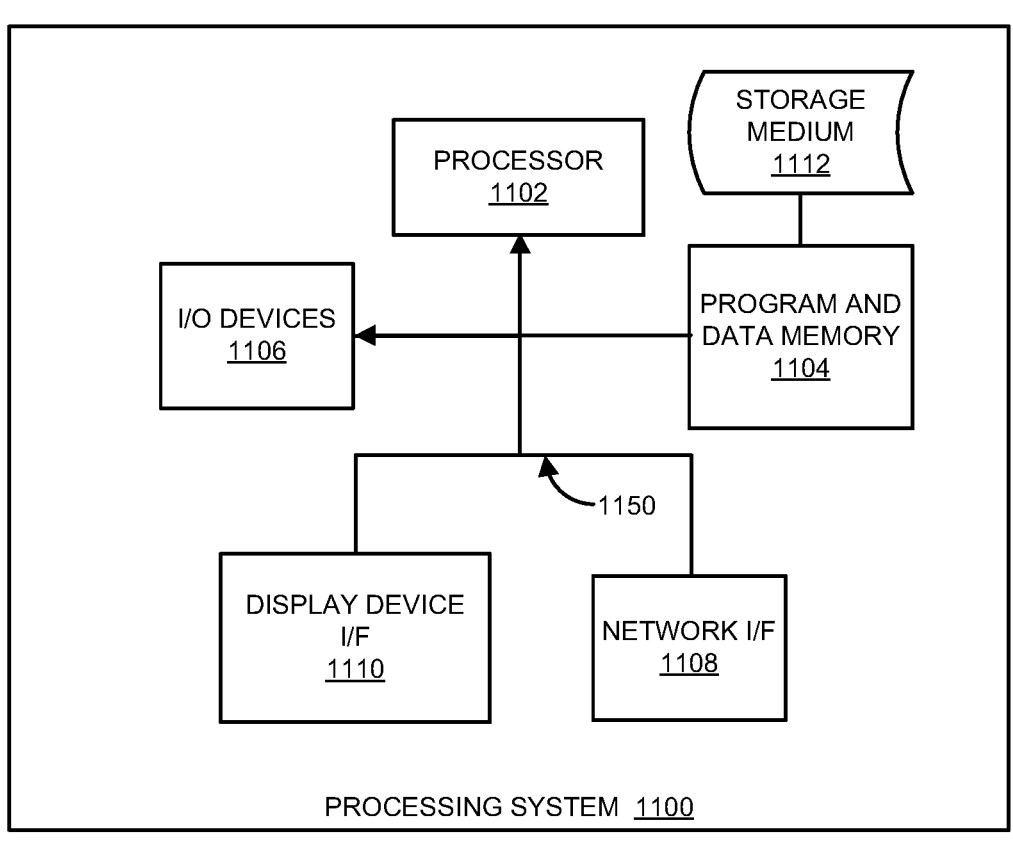
FIG. 11 illustrates a processing system operable to execute a computer readable medium embodying programmed instructions to perform desired functions in an illustrative embodiment.

Embodiments disclosed herein can take the form of software, hardware, firmware, or various combinations thereof. FIG. 11 illustrates a processing system 1100 operable to execute a computer readable medium embodying programmed instructions to perform desired functions in an illustrative embodiment. Processing system 1100 is operable to perform the above operations by executing programmed instructions tangibly embodied on computer readable storage medium 1112. In this regard, embodiments can take the form of a computer program accessible via computer-readable medium 1112 providing program code for use by a computer or any other instruction execution system. For the purposes of this description, computer readable storage medium 1112 can be anything that can contain or store the program for use by the computer.

Computer readable storage medium 1112 can be an electronic, magnetic, optical, electromagnetic, infrared, or semiconductor device. Examples of computer readable storage medium 1112 include a solid-state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1100, being suitable for storing and/or executing the program code, includes at least one processor 1102 coupled to program and data memory 1104 through a system bus 1150. Program and data memory 1104 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1106 (including but not limited to keyboards, displays, pointing devices, etc.) can be coupled either directly or through intervening I/O controllers. Network adapter interfaces 1108 may also be integrated with the system to enable processing system 1100 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1110 may be integrated with the system to interface to one or more display devices, such as printing systems and screens for presentation of data generated by processor 1102.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes an apparatus comprising a cloud print mediator configured to communicatively couple to a cloud printing service provisioned on a cloud-computing platform, and to communicatively couple to a printer. The cloud print mediator comprises at least one processor and memory. The at least one processor is configured to cause the cloud print mediator at least to receive a print job from the cloud printing service, submit the print job to the printer, receive status messages from the printer regarding processing of the print job, identify throttling criteria that defines one or more conditions where status notifications are allowed to be reported to the cloud printing service, and perform status notification throttling based on the throttling criteria to regulate the status notifications reported to the cloud printing service in response to the status messages received from the printer.

Example 2 includes the subject matter of Example 1, where the at least one processor is configured to cause the cloud print mediator to perform the status notification throttling by comparing a status message of the status messages received from the printer with the throttling criteria, reporting a status notification to the cloud printing service when the status message satisfies the throttling criteria, and withholding the status notification from the cloud printing service when the status messages does not satisfy the throttling criteria.

Example 3 includes the subject matter of Examples 1 and 2, where the throttling criteria defines a condition that a status notification is allowed when a status message indicates a state transition.

Example 4 includes the subject matter of Examples 1-3, where the throttling criteria defines a condition that a status notification is allowed when the status messages indicate that progress of printing the print job at the printer reaches one or more progress thresholds.

Example 5 includes the subject matter of Examples 1-4, where the throttling criteria defines a condition that a status notification is allowed periodically at expiration of a time period.

Example 6 includes the subject matter of Examples 1-5, where the throttling criteria defines a condition that a status notification is allowed after receipt of a threshold number of the status messages from the printer.

Example 7 includes the subject matter of Examples 1-6, where the at least one processor is further configured to cause the cloud print mediator at least to determine whether to perform the status notification throttling based on the throttling criteria.

Example 8 includes the subject matter of Examples 1-7, where the at least one processor is further configured to cause the cloud print mediator at least to determine whether to perform the status notification throttling based on a state of the printer or a state of the print job.

Example 9 includes the subject matter of Examples 1-8, where the at least one processor is further configured to cause the cloud print mediator at least to determine whether to perform the status notification throttling based on a size of the print job.

Example 10 includes the subject matter of Examples 1-9, where the at least one processor is further configured to cause the cloud print mediator at least to determine whether to perform the status notification throttling based on whether the printer uses a protocol that pushes the status messages to the cloud print mediator.

Example 11 includes the subject matter of Examples 1-10, where a printing system comprises the cloud print mediator and the printer.

Some embodiments pertain to Example 12 that includes a method of throttling status notifications to a cloud printing service. The method comprises receiving a print job from the cloud printing service, submitting the print job to a printer, receiving status messages from the printer regarding processing of the print job, identifying throttling criteria that defines one or more conditions where status notifications are allowed to be reported to the cloud printing service, and performing status notification throttling based on the throttling criteria to regulate the status notifications reported to the cloud printing service in response to the status messages received from the printer.

Example 13 includes the subject matter of Example 12, where the performing comprises comparing a status message of the status messages received from the printer with the throttling criteria, reporting a status notification to the cloud printing service when the status message satisfies the throttling criteria, and withholding the status notification from the cloud printing service when the status messages does not satisfy the throttling criteria.

Example 14 includes the subject matter of Examples 12 and 13, where the throttling criteria defines a condition that a status notification is allowed when a status message indicates a state transition.

Example 15 includes the subject matter of Examples 12-14, where the throttling criteria defines a condition that a status notification is allowed when the status messages indicate that progress of printing the print job at the printer reaches one or more progress thresholds.

Example 16 includes the subject matter of Examples 12-15, where the throttling criteria defines a condition that a status notification is allowed periodically at expiration of a time period.

Example 17 includes the subject matter of Examples 12-16, where the throttling criteria defines a condition that a status notification is allowed after receipt of a threshold number of the status messages from the printer.

Example 18 includes the subject matter of Examples 12-17, further comprising determining whether to perform the status notification throttling based on the throttling criteria.

Some embodiments pertain to Example 19 that includes a non-transitory computer readable medium embodying programmed instructions executed by a processor, where the instructions direct the processor to implement a method of throttling status notifications to a cloud printing service, the method comprising receiving a print job from the cloud printing service, submitting the print job to a printer, receiving status messages from the printer regarding processing of the print job, identifying throttling criteria that defines one or more conditions where status notifications are allowed to be reported to the cloud printing service, and performing status notification throttling based on the throttling criteria to regulate the status notifications reported to the cloud printing service in response to the status messages received from the printer.

Example 20 includes the subject matter of Example 19, where the performing comprises comparing a status message of the status messages received from the printer with the throttling criteria, reporting a status notification to the cloud printing service when the status message satisfies the throttling criteria, and withholding the status notification from the cloud printing service when the status messages does not satisfy the throttling criteria.

Although specific embodiments were described herein, the scope of the invention is not limited to those specific embodiments. The scope of the invention is defined by the following claims and any equivalents thereof.

What is claimed is:

1. An apparatus, comprising:

a cloud print mediator configured to interface one or more printers with a cloud printing service, the cloud print mediator configured to be on-premises with a printer and directly connected to the printer, and further configured to communicatively couple to the cloud printing service over a network;

the cloud print mediator comprising at least one processor and memory;

the at least one processor configured to cause the cloud print mediator at least to:

receive a print job from the cloud printing service;

submit the print job to the printer;

receive status messages from the printer regarding processing of the print job;

identify throttling criteria that defines one or more conditions where status notifications are allowed to be reported to the cloud printing service; and perform status notification throttling based on the throttling criteria to regulate the status notifications reported to the cloud printing service in response to the status messages received from the printer.

2. The apparatus of claim 1, wherein the at least one processor is configured to cause the cloud print mediator to perform the status notification throttling by:

comparing a status message of the status messages received from the printer with the throttling criteria;

reporting a status notification to the cloud printing service when the status message satisfies the throttling criteria; and withholding the status notification from the cloud printing service when the status messages does not satisfy the throttling criteria.

3. The apparatus of claim 1, wherein:

the throttling criteria defines a condition that a status notification is allowed when a status message indicates a state transition.

4. The apparatus of claim 1, wherein:

the throttling criteria defines a condition that a status notification is allowed when the status messages indicate that progress of printing the print job at the printer reaches one or more progress thresholds.

5. The apparatus of claim 1, wherein:

the throttling criteria defines a condition that a status notification is allowed periodically at expiration of a time period.

6. The apparatus of claim 1, wherein:

the throttling criteria defines a condition that a status notification is allowed after receipt of a threshold number of the status messages from the printer.

7. The apparatus of claim 1, wherein the at least one processor is further configured to cause the cloud print mediator at least to:

determine whether to perform the status notification throttling based on the throttling criteria.

8. The apparatus of claim 7, wherein the at least one processor is further configured to cause the cloud print mediator at least to:

determine whether to perform the status notification throttling based on a state of the printer or a state of the print job.

9. The apparatus of claim 7, wherein the at least one processor is further configured to cause the cloud print mediator at least to:

determine whether to perform the status notification throttling based on a size of the print job.

10. The apparatus of claim 7, wherein the at least one processor is further configured to cause the cloud print mediator at least to:

determine whether to perform the status notification throttling based on whether the printer uses a protocol that pushes the status messages to the cloud print mediator.

11. A printing system, comprising:

the cloud print mediator of claim 1; and the printer.

12. A method comprising:

at a cloud print mediator configured to interface one or more printers with a cloud printing service, the cloud print mediator on-premises with a printer and directly connected to the printer, and communicatively coupled to the cloud printing service over a network:

receiving a print job from the cloud printing service;

submitting the print job to the printer;

receiving status messages from the printer regarding processing of the print job;

identifying throttling criteria that defines one or more conditions where status notifications are allowed to be reported to the cloud printing service; and performing status notification throttling based on the throttling criteria to regulate the status notifications reported to the cloud printing service in response to the status messages received from the printer.

13. The method of claim 12, wherein the performing comprises:

comparing a status message of the status messages received from the printer with the throttling criteria;

reporting a status notification to the cloud printing service when the status message satisfies the throttling criteria; and withholding the status notification from the cloud printing service when the status messages does not satisfy the throttling criteria.

14. The method of claim 12, wherein:

the throttling criteria defines a condition that a status notification is allowed when a status message indicates a state transition.

15. The method of claim 12, wherein:

the throttling criteria defines a condition that a status notification is allowed when the status messages indicate that progress of printing the print job at the printer reaches one or more progress thresholds.

16. The method of claim 12, wherein:

the throttling criteria defines a condition that a status notification is allowed periodically at expiration of a time period.

17. The method of claim 12, wherein:

the throttling criteria defines a condition that a status notification is allowed after receipt of a threshold number of the status messages from the printer.

18. The method of claim 12, further comprising:

determining whether to perform the status notification throttling based on the throttling criteria.

19. A non-transitory computer readable medium embodying programmed instructions executed by a processor, wherein the instructions direct the processor to implement a method comprising:

at a cloud print mediator configured to interface one or more printers with a cloud printing service, the cloud print mediator on-premises with a printer and directly connected to the printer, and communicatively coupled to the cloud printing service over a network:

receiving a print job from the cloud printing service;

submitting the print job to the printer;

receiving status messages from the printer regarding processing of the print job;

identifying throttling criteria that defines one or more conditions where status notifications are allowed to be reported to the cloud printing service; and performing status notification throttling based on the throttling criteria to regulate the status notifications reported to the cloud printing service in response to the status messages received from the printer.

20. The non-transitory computer readable medium of claim 19, wherein the performing comprises:

comparing a status message of the status messages received from the printer with the throttling criteria;

reporting a status notification to the cloud printing service when the status message satisfies the throttling criteria; and withholding the status notification from the cloud printing service when the status messages does not satisfy the throttling criteria.

* * * * *